United States Patent
Uhrenholt

(10) Patent No.: US 12,412,333 B2
(45) Date of Patent: Sep. 9, 2025

(54) METHODS AND APPARATUS FOR PROCESSING GRAPHICS DATA

(71) Applicant: Arm Limited, Cambridge (GB)

(72) Inventor: Olof Henrik Uhrenholt, Cambridge (GB)

(73) Assignee: Arm Limited, Cambridge (GB)

(*) Notice: Subject to any disclaimer, the term of this patent is extended or adjusted under 35 U.S.C. 154(b) by 265 days.

(21) Appl. No.: 18/181,260

(22) Filed: Mar. 9, 2023

(65) Prior Publication Data

US 2023/0298251 A1  Sep. 21, 2023

(30) Foreign Application Priority Data

Mar. 15, 2022 (GB) .................................. 2203597

(51) Int. Cl.
 G06T 15/04 (2011.01)
 G06T 9/00 (2006.01)

(52) U.S. Cl.
 CPC ............... *G06T 15/04* (2013.01); *G06T 9/00* (2013.01)

(58) Field of Classification Search
 None
 See application file for complete search history.

(56) References Cited

U.S. PATENT DOCUMENTS

2020/0193697 A1* 6/2020 Brennan ................. G06T 15/80

FOREIGN PATENT DOCUMENTS

GB  2557657 A  6/2018

* cited by examiner

*Primary Examiner* — Kyle Zhai
(74) *Attorney, Agent, or Firm* — NIXON & VANDERHYE P.C.

(57) ABSTRACT

Aspects of the present disclosure relate to an apparatus comprising graphics data receiver circuitry, rendering circuitry and render feedback circuitry. Graphics data comprising tiles of texture mipmap data is received and rendered to produce a rendered output, based on a used set of tiles. An intermediate representation of the used set is generated in the form of a bitmap. Based on this, a z-ordering is applied to valid bits of bitmap elements to generate a final representation of the used set.

16 Claims, 4 Drawing Sheets

METHODS AND APPARATUS FOR PROCESSING GRAPHICS DATA

CROSS-REFERENCE TO RELATED APPLICATIONS

This application claims priority pursuant to 35 U.S.C. 119(a) to British Application No. 2203597.6, filed Mar. 15, 2022, which application is incorporated herein by reference in its entirety.

BACKGROUND

The present technique relates to the field of graphics processing, and more particularly to the processing of texture information. Graphics processing, for example 3D rendering, can incur significant usage of computing resources. One way of reducing this resource usage is by the use of mipmaps. Mipmaps are a sets of versions of the same image, each with progressively lower resolution. This improves the efficiency of rendering: a processor may provide, to a graphics processor such as a graphics processing unit (GPU), mipmaps associated with a series of objects that are to be included in a rendered scene. The graphics processor can select from the different resolution levels as appropriate for each object. For example, an object "near" to the viewer may be rendered based on a high-resolution mipmap, whilst an object "far" from the viewer may be rendered based on a low-resolution mipmap. In this way, the rendered image can be produced much more efficiently.

However, despite the use of efficiency-improving techniques such as this, rendering and other graphics processing can still be extremely computationally intensive. There is thus a desire for improved rendering methods.

SUMMARY

At least some examples provide an apparatus comprising: graphics data receiver circuitry to receive graphics data, the graphics data comprising texture mipmap data corresponding to a plurality of representations of texture data, each representation being a mipmap level having a progressively lower resolution and comprising one or more tile regions; rendering circuitry to process the graphics data to produce a rendered output, said processing comprising determining a used set of tile regions, the used set comprising at least one of said one or more tile regions within at least one of said mipmap levels, upon which the rendered output is based; and render feedback circuitry to: generate an intermediate representation of the used set of tile regions by encoding the used set of tile regions into a bitmap, wherein: each bitmap value represents a corresponding tile region in at least one mipmap level and has a bit representing each of a plurality of said mipmap levels; and the render feedback circuitry is configured to set one or more of said bits representing each of the used set of tile regions, for each combination of intermediate representation bitmap value and mipmap level, determine a bit offset to produce a z-ordering of the bitmap value bits which correspond to valid combinations of mipmap level and tile region in the received graphics data; and generate a final representation of the used set of tile regions, by applying the z-ordering to the intermediate representation.

Further examples provide a method comprising: receiving graphics data, the graphics data comprising texture mipmap data corresponding to a plurality of representations of texture data, each representation being a mipmap level having a progressively lower resolution and comprising one or more tile regions; processing the graphics data to produce a rendered output, said processing comprising determining a used set of tile regions, the used set comprising at least one of said one or more tile regions within at least one of said mipmap levels, to base the rendered output upon; and generating an intermediate representation of the used set of tile regions by encoding the used set of tile regions into a bitmap, wherein: each bitmap value represents a corresponding tile region in at least one mipmap level and has a bit representing each of a plurality of said mipmap levels; and the generating the intermediate representation comprises setting one or more of said bits representing each of the used set of tile regions, for each combination of intermediate representation bitmap value and mipmap level, determining a bit offset to produce a z-ordering of the bitmap value bits which correspond to valid combinations of mipmap level and tile region in the received graphics data; and generating a final representation of the used set of tile regions, by applying the z-ordering to the intermediate representation.

Further examples provide a non-transitory computer-readable medium to store computer-readable code for fabrication of the above-described apparatus.

Further examples provide a system comprising: processing circuitry; and an apparatus comprising: graphics data receiver circuitry to receive graphics data from the processing circuitry, the graphics data comprising texture mipmap data corresponding to a plurality of representations of texture data, each representation being a mipmap level having a progressively lower resolution and comprising one or more tile regions; rendering circuitry to process the graphics data to produce a rendered output, said processing comprising determining a used set of tile regions, the used set comprising at least one of said one or more tile regions within at least one of said mipmap levels, to base the rendered output upon; and render feedback circuitry to: generate an intermediate representation of the used set of tile regions by encoding the used set of tile regions into a bitmap, wherein: each bitmap value represents a corresponding tile region in at least one mipmap level and has a bit representing each of a plurality of said mipmap levels; and the render feedback circuitry sets one or more of said bits representing each of the used set of tile regions, for each combination of intermediate representation bitmap value and mipmap level, determine a bit offset to produce a z-ordering of the bitmap value bits which correspond to valid combinations of mipmap level and tile region in the received graphics data; generate a final representation of the used set of tile regions, by applying the z-ordering to the intermediate representation; and output the final representation to the processing circuitry. Further aspects, features and advantages of the present technique will be apparent from the following description of examples, which is to be read in conjunction with the accompanying drawings.

DESCRIPTION OF EXAMPLES

Figure 1:
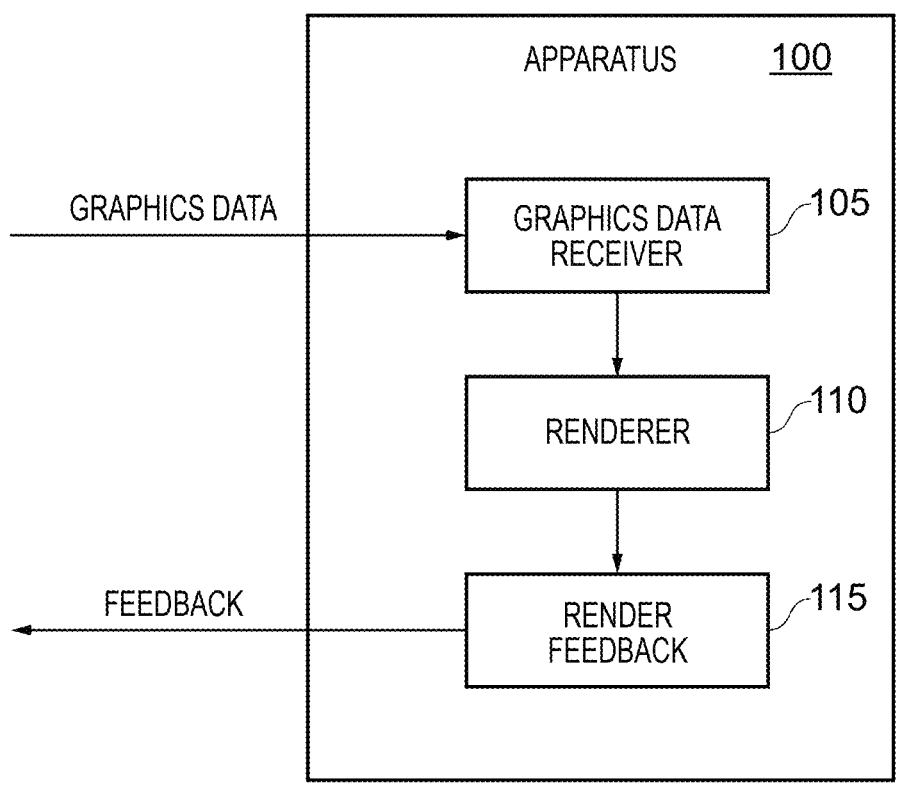
FIG. 1 schematically depicts an apparatus 100 according to an example.

An example of the present disclosure provides an apparatus, which may for example be a graphics processor such as a GPU.

The apparatus comprises graphics data receiver circuitry to receive graphics data. The graphics data comprises texture mipmap data corresponding to a plurality of representations of texture data. Each representation is a mipmap level having a progressively lower resolution and comprising one or more tile regions. Thus, each mipmap level is divided into tiles of a given size. The graphics data may for example be texture data comprising a plurality of texels or pixels. In this example, the tile size may be expressed in terms of the number of texels within each tile, or the number of texels defining the x and y dimensions of a tile.

The apparatus comprises rendering circuitry to process the graphics data to produce a rendered output. As noted above, this rendering would be expected to use data from different mipmap levels, depending on the "distance" to a rendered object. Furthermore, in some cases, only a subset of a given mipmap level is used: for example, the graphics data may comprise data defining a 3D object that is to form part of the rendered output. The front of the object would be visible in the output, but the back of the object would not. The data (e.g. texels) corresponding to the back of the object is thus not used to produce the rendered output. Thus, a subset of tile regions at a subset of mipmap levels can be used to produce the rendered output.

As part of this processing to produce the rendered output, the rendering circuitry determines which tile regions, at which mipmap levels, were used to produce the output image. This provides a "used set" comprising one or more tile regions at one or more mipmap levels, on which the rendered output is based.

The apparatus comprises render feedback circuitry which feeds back details of the used set, for example to a processor which initially provided the graphics data. The processor can then use this feedback to inform its subsequent production of graphics data. For example, if certain tile regions at certain mipmap levels are not used to produce the rendered output, the processor may exclude these from subsequent graphics data. This provides improved efficiency compared with comparative examples in which such feedback is not provided, and the processor does not receive information about which tile regions at which mipmap levels were actually used.

More specifically, the render feedback circuitry is configured to generate an intermediate representation of the used set of tile regions by encoding the used set of tile regions into a bitmap. Each bitmap value represents a corresponding tile region in at least one mipmap level, and has a bit representing each of a plurality of said mipmap levels. The render feedback circuitry is configured to set one or more of these bits, representing each of the used set of tile regions. The intermediate representation can thus be considered as a bit mask, which each tile region at each mipmap level having a corresponding bit.

After the bits have been set, the intermediate representation thus forms a bitwise representation of the used set. The intermediate representation could therefore be directly provided as the feedback. However, aspects of the present disclosure further improve efficiency by providing a more efficient way of representing the used set. This is performed by taking advantage of the observation (explained in more detail below) that some of the bits in some bitmap values do not actually correspond to a valid combination of tile region and bitmap level. For example, this may be because lower-resolution mipmap levels have fewer tile regions, and thus some bits that ostensibly correspond to lower-resolution mipmap levels do not correspond to tile regions that exist at that mipmap level.

For each combination of intermediate representation bitmap value and mipmap level, the render feedback circuitry determines a bit offset to produce a z-ordering of the bitmap value bits which correspond to valid combinations of mipmap level and tile region in the received graphics data.

The render feedback circuitry is configured to generate a final representation of the used set of tile regions, by applying the z-ordering to the intermediate representation. As explained in more detail below, this produces a much more closely-packed representation of the used set, which eliminates (or significantly reduces) the number of unused bits.

The final representation may then be provided for example to the entity which provided the graphics data, for example the aforementioned processor, or another entity which is to produce subsequent graphics data. As explained above, this allows improved efficiency in the production, transmission and processing of such graphics data, because it can be constructed to exclude tile regions (at particular mipmap levels) which will not, or are unlikely, to be used in production of a rendered output.

In an example, a given tile region has co-ordinates (x, y) and a given mipmap level. The render feedback circuitry is configured to determine the aforementioned bit offset for the given tile region by initially interleaving x and y of the given tile region to produce an interleaved value I, and setting a BitOffset variable to an initial value equal to the given mipmap level. A loop is then performed in the range of minimum mipmap level to maximum mipmap level. For each iteration of the loop, a variable $r = (1 << (2*[\text{mipmap level}])) - 1$ is determined. The BitOffset value is then incremented as $\text{BitOffset} += (I+r) >> (2*\text{mipmap level})$ A final BitOffset value is then output as the bit offset for the given tile region at the given mipmap level. This provides a computationally effective way to determine the above-described bit offset value, to produce the z-ordering of the valid bitmap bits.

Alternatively or additionally, the intermediate representation may be encoded as a bitmap. In this example, the render feedback circuitry is configured to determine the one or more of said bits to set by, for each tile region (x, y) at mipmap level m upon which the rendered output was based, performing an OR operation according to:

intermediate rep. bitmap $[x \ \&\sim((1<<m)-1)]$ $[y \ \&\sim((1<<m)-1)] \mathrel{|}= 1<<m$ In an example, one of the above-described "mipmap levels" is a mipmap tail comprising multiple mipmap levels. For example, two or more of the lowest-resolution mipmap levels may include a sufficiently small quantity of data that they can be stored together in a data structure having a capacity corresponding to a single higher-resolution mipmap level. In this example, the render feedback circuitry may be configured to perform an additional iteration of the aforementioned loop. This accounts for the multiple mipmap levels in the tail, and ensures that the bit offset is correctly calculated.

In some examples, the final representation is encoded as a texture. Treating the final representation as a single texture in its own right is possible because it has properties in common with a texture. In particular, it can be effectively compressed using a lossless texture compression algorithm, thereby further reducing the size of the final representation. This also allows the recipient of the feedback information (e.g. the aforementioned processor) to unpack the encoded final representation as a texture, and process it in this form. This is a computationally efficient way for the final representation to be handled by an entity which is already configured to process texture data. Examples of the present disclosure will now be described with reference to the drawings.

FIG. 1 schematically shows an apparatus 100 according to an example of the present disclosure. The apparatus may be a GPU, or may be implemented by conceptual/logical functionality of a GPU or another form of processing circuitry. The elements described below may be physical circuitry components, or may be implemented by general processing circuitry of the apparatus.

The apparatus 100 comprises a graphics data receiver 105, which receives graphics data. The graphics data comprises texture mipmap data.

Figure 2:
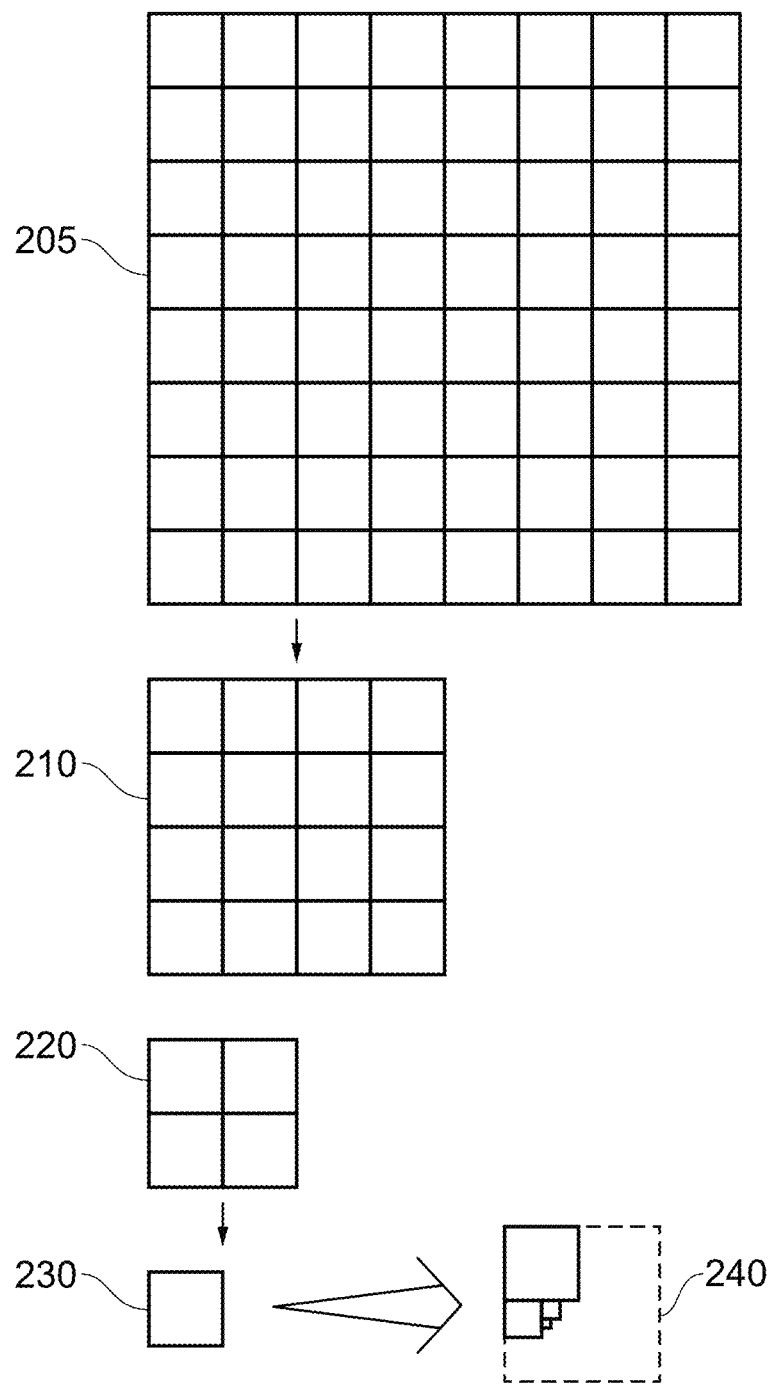
FIG. 2 illustrates texture mipmap data according to an example.

FIG. 2 illustrates the texture mipmap data.

FIG. 2 depicts a plurality of mipmap levels 205, 210, 220, 230, 240. Each mipmap level is a representation of texture (e.g. a texture map of an object) comprising a matrix of texels. Each subsequent mipmap level has half the texel resolution of the previous level.

The mipmap levels are each divided into one or more tile regions, with a tile region having a given texel resolution (for example 128×128 texels). Thus, the highest-resolution mipmap level 205 is a matrix of 8×8 tiles. The next-highest level 210 comprises 4×4 tiles. Level 220 then has 2×2 tiles, and level 230 has a single tile.

The final level 240 has the size of a single tile, but is enlarged in FIG. 2. This level is a mipmap tail: it comprises multiple mipmap levels, each of which has a resolution smaller than a single tile. This provides an efficient way to store the lowest-resolution levels (which could potentially go down to a level having a single texel).

Returning to FIG. 1, the apparatus 100 comprises a renderer 110 which receives the graphics data and produces a rendered output based on this. This rendered output would be expected to use some, but not all, tiles. For example, for visible areas of a close object, which is to be rendered with high detail, corresponding tiles of a high mipmap level 205 could be used. For visible areas of a far object, which is to be rendered with low detail, corresponding tiles of a lower mipmap level 230 could be used. Tiles corresponding to parts of objects which are not visible would not be used in the rendering process. The set of tiles, at various mipmap levels, which were used to generate the rendered output can be termed a "used set".

The apparatus comprises render feedback functionality 115 which generates an intermediate representation of the used set of tiles. The intermediate representation is an 8×8 bitmap which can be considered a texture in its own right.

In an illustrative example, a texture has a resolution of 1024×1024 texels (or pixels). The texture is subdivided into tiles, each having dimensions of 128×128. Based on this, mipmap levels are determined as follows:

| Mipmap level | Resolution |
|---|---|
| 0 | 1024 × 1024 |
| 1 | 512 × 512 |
| 2 | 256 × 256 |
| 3 | 128 × 128 |
| 4 | Mipmap tail (64 × 64, 32 × 32, 16 × 16, 8 × 8, 4 × 4) |

Each element (i.e. "pixel") of the intermediate representation corresponds to a given tile, and comprises a 5-bit value. Each bit of the 5-bit value corresponds to a particular mipmap level. Thus, the first bit of the top-left element may correspond to the top-left tile at mipmap level 0. If a given tile, with co-ordinates (x, y) at mipmap level m, is used to produce the rendered output, an atomicOR operation is used to set a corresponding bit in the intermediate representation:

$$[x\ \&\ {\sim}((1{<<}m)-1)][y\ \&\ ((1{<<}m)]-1)]\mathrel{|}= 1{<<}m$$

This has the effect that bits corresponding to used tiles are given a value of 1, and all other bits have a value of zero.

This intermediate representation provides an effective way to represent the used set of tiles. However, the inventors have seen that this representation is inefficient, as it includes bits which do not correspond to valid combinations of tile co-ordinate and mipmap level. More specifically, every element of the intermediate representation includes a bit for mipmap level 0 (e.g. the first bit). Mipmap level 1 has half the number of tiles, and thus every second element comprises a bit for level 1. Similarly, every fourth element comprises a bit for level 2, and so on. This means that many bits are unused. This can be illustrated by the following, which depicts hexadecimal values of each element, if every tile at every mipmap level were used. Binary zeroes in the following thus correspond to bits which will never be used,

| 0x1F | 0x1 | 0x3 | 0x1 | 0x7 | 0x1 | 0x3 | 0x1 |
|---|---|---|---|---|---|---|---|
| 0x1 | 0x1 | 0x1 | 0x1 | 0x1 | 0x1 | 0x1 | 0x1 |
| 0x3 | 0x1 | 0x3 | 0x1 | 0x7 | 0x1 | 0x3 | 0x1 |
| 0x1 | 0x1 | 0x1 | 0x1 | 0x1 | 0x1 | 0x1 | 0x1 |
| 0x7 | 0x1 | 0x3 | 0x1 | 0x7 | 0x1 | 0x3 | 0x1 |
| 0x1 | 0x1 | 0x1 | 0x1 | 0x1 | 0x1 | 0x1 | 0x1 |
| 0x3 | 0x1 | 0x3 | 0x1 | 0x7 | 0x1 | 0x3 | 0x1 |
| 0x1 | 0x1 | 0x1 | 0x1 | 0x1 | 0x1 | 0x1 | 0x1 |

It can be seen that for every element apart from the top-left element (with value 0x1F) has some zeroes, and thus has bits which are not used.

In order to efficiently store this information, a z-ordering (Morton ordering) of the valid bits is determined, to provide a final representation. The following table shows an example of how this can be performed for a 4×4 intermediate representation (which could e.g. provide feedback for a 512×512 texture). The table shows the x and y coordinates of a given tile, its mipmap level, and a bit offset of that tile within the representation. The mipmap tail is not shown in this table.

| x | y | m | Bit offset |
|---|---|---|---|
| 0 | 0 | 0 | 0 |
| 0 | 0 | 1 | 1 |
| 0 | 0 | 2 | 2 |
| 0 | 0 | 3 | 3 |
| 1 | 0 | 0 | 4 |
| 0 | 1 | 0 | 5 |
| 1 | 1 | 0 | 6 |

-continued

| x | y | m | Bit offset |
|---|---|---|---|
| 2 | 0 | 0 | 7 |
| 2 | 0 | 1 | 8 |
| 3 | 0 | 0 | 9 |
| 2 | 1 | 0 | 10 |
| 3 | 1 | 0 | 11 |
| 0 | 2 | 0 | 12 |
| 0 | 2 | 1 | 13 |
| 1 | 2 | 0 | 14 |
| 0 | 3 | 0 | 15 |
| 1 | 3 | 0 | 16 |
| 2 | 2 | 0 | 17 |
| 2 | 2 | 1 | 18 |
| 3 | 2 | 0 | 19 |
| 2 | 3 | 0 | 20 |
| 3 | 3 | 0 | 21 |

It can be seen that the table includes all valid combinations of (x, y) tile co-ordinate and mipmap level, whilst not including any invalid combinations. The resulting 22-bit final representation thus provides a closely-packed, efficient representation of the used set: every bit has a valid meaning, and no bits are wasted. The offset can be calculated by the following procedure, expressed in pseudocode:

```
I0 = interleave (x, y)   /* The interleave function provides the z-order by interleaving
     the bit patterns of x and y   */
BitOffset = mip_level
for mip_level in 0..max_miplevel
  r = (1 << (2 * [mipmap level])) −1
  BitOffset += (I + r) >> (2 * mipmap level)
  if (miplevel == max_miplevel) BitOffset += (I + r) >> (2 * mipmap level)
     /* This accounts for the mipmap tail by counting the final level
     twice   */
```

This method, expressed for brevity in terms of a 4×4 intermediate representation, can be extended to any number of tiles and mipmap levels. This provides a size reduction of around a factor of 48, regardless of the number of tiles. The writing and reading of the representation is also efficient. The writing (which can be performed during the rendering process) uses atomicOR operations. Also, the z-ordering has an effect that multiple mipmap levels corresponding to the same tile location are typically stored adjacently in memory (or other storage). This provides preferable memory access properties when the final representation is read (e.g. in a decode stage of a processing pipeline).

The inventors have further recognised that the final representation is effectively a texture in its own right. It can thus be compressed using lossless texture compression algorithm, which can provide an additional compression factor of between 2× and 64×. The variance in potential additional compression factor is because the actual additional compression factor in a particular case is dependent on the properties of the specific final representation. For example, a final representation which includes many zeroes (for example because many parts of the texture map are not visible in the rendered output) can be efficiently compressed using delta compression on neighbouring pixels.

Figure 3:
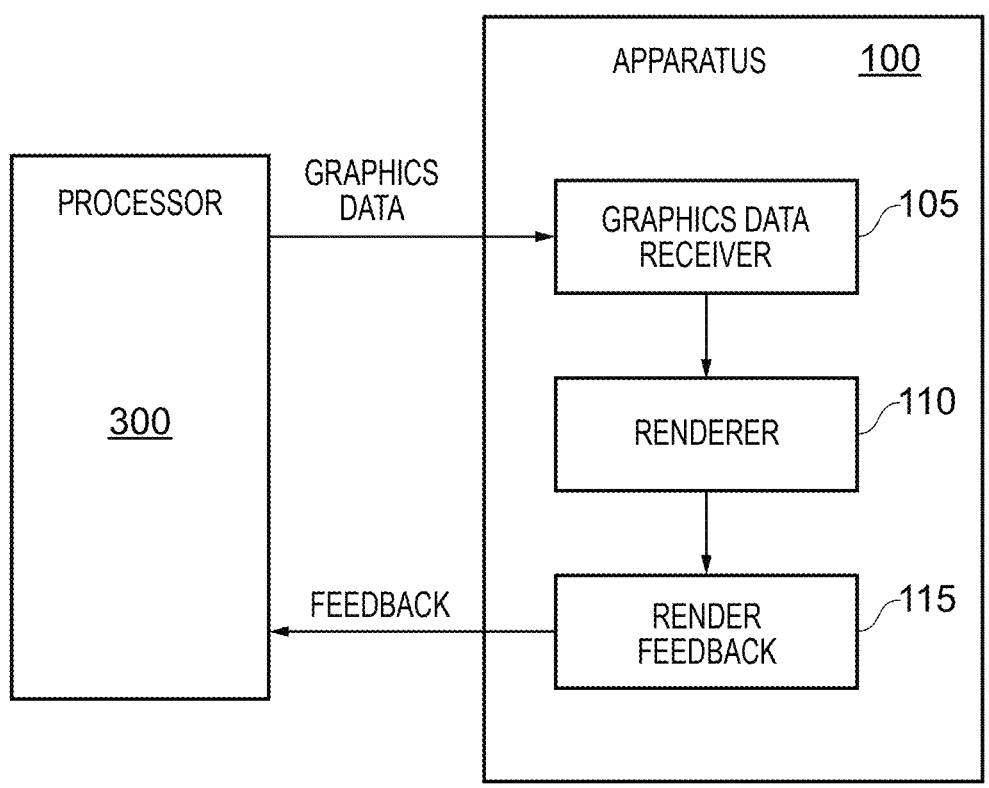
FIG. 3 schematically depicts a system according to an example.

FIG. 3 schematically depicts a system according to an example. The system comprises the apparatus 100 discussed above in relation to FIG. 1, and a processor 300. The processor 300 may be a separate unit, for example it may be a CPU whilst the apparatus is a GPU. Alternatively, the apparatus 100 and processor 300 may be implemented by conceptual units of the same physical circuitry (for example a GPU).

The processor 300 is configured to provide the graphics data to the apparatus 100, for rendering. This includes multiple tiles at multiple mipmap levels as described above, and may also comprise further information for example describing the relative position of objects within the rendered output.

Following the rendering and determination of the final representation (as discussed above), feedback including the final representation is returned from the apparatus 100 to the processor 300. The processor can then take the feedback into account when generating subsequent graphics data. For example, it may omit to generate graphics data for tile/mipmap level combinations which it does not expect to be used to produce subsequent rendered output. The overall processing and transmission burden upon the system is thus reduced.

Figure 4:
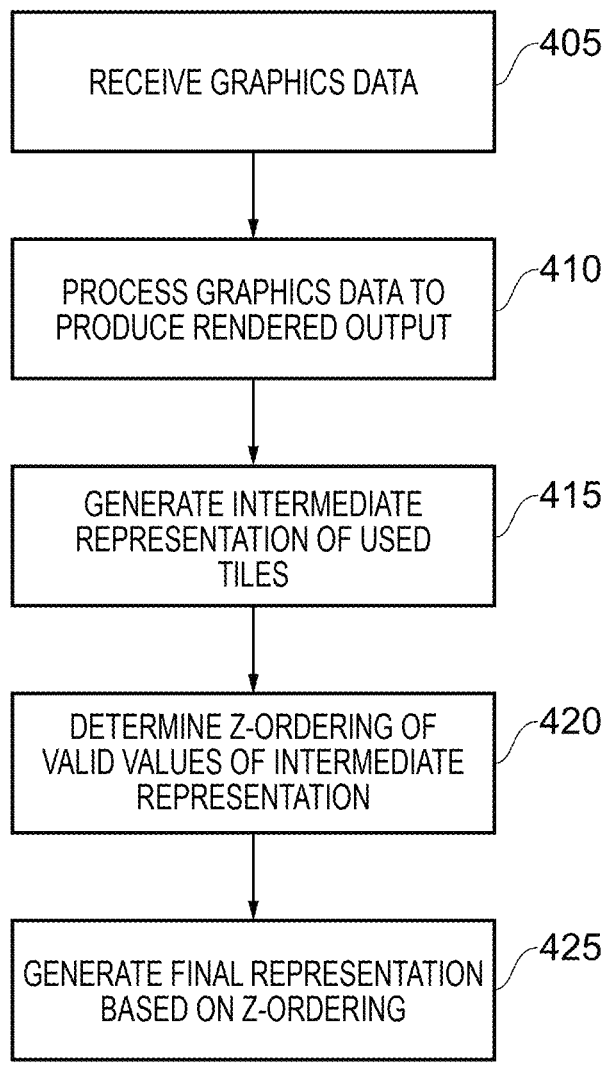
FIG. 4 depicts a method according to an example.

FIG. 4 depicts a method according to an example. The method may for example be performed by the apparatus 100 described above. At block 405, graphics data is received. The graphics data comprises tiles at a plurality of mipmap levels. At block 410, the graphics data is processed to produce a rendered output. To do this, a subset of the tiles are used. At block 415, an intermediate representation of the used set of tiles is generated. At block 420, a z-ordering of valid values of the intermediate representation is determined. At block 425, a final representation of the used set is generated based on the z-ordering.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 5:
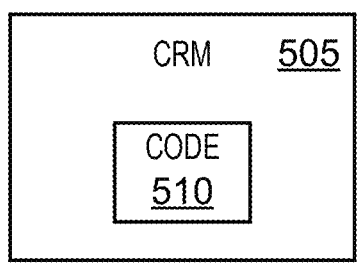
FIG. 5 shows a computer-readable medium according to an example.

FIG. 5 shows an example of such a computer-readable medium 505, which comprises code 510 for fabrication of one or more of the apparatuses described herein.

Apparatuses and methods are thus provided for efficiently representing tiles which are used during a rendering operation.

From the above description it will be seen that the techniques described herein provides a number of significant benefits. In particular, the final representation of the used set of tiles does not include any wasted bits.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

What is claimed is:

1. An apparatus comprising:
graphics data receiver circuitry to receive graphics data, the graphics data comprising texture mipmap data corresponding to a plurality of representations of texture data, each representation being a mipmap level having a progressively lower resolution and comprising one or more tile regions;
rendering circuitry to process the graphics data to produce a rendered output, said processing comprising determining a used set of tile regions, the used set comprising at least one of said one or more tile regions within at least one of said mipmap levels, upon which the rendered output is based; and
render feedback circuitry to:
generate an intermediate representation of the used set of tile regions by encoding the used set of tile regions into a bitmap, wherein:
each bitmap value represents a corresponding tile region in at least one mipmap level and has a bit representing each of a plurality of said mipmap levels; and
the render feedback circuitry is configured to set one or more of said bits representing each of the used set of tile regions,
for each combination of intermediate representation bitmap value and mipmap level, determine a bit offset to produce a z-ordering of the bitmap value bits which correspond to valid combinations of mipmap level and tile region in the received graphics data; and
generate a final representation of the used set of tile regions, by applying the z-ordering to the intermediate representation.

2. The apparatus according to claim 1, wherein the render feedback circuitry is configured to determine the bit offset for a given tile region with co-ordinates (x, y) at a given mipmap level by:
interleaving x and y of the given tile region to produce an interleaved value I;
setting a BitOffset variable to an initial value equal to the given mipmap level;
perform a loop in the range of minimum mipmap level to maximum mipmap level comprising:

determining a variable $r=(1<<(2*[\text{mipmap level}]))-1$ performing $\text{BitOffset}+=(I+r)>>(2*\text{mipmap level})$ and outputting a final BitOffset value as the bit offset for the given tile region at the given mipmap level.

3. The apparatus according to claim 2, wherein:
one of said mipmap levels is a mipmap tail comprising multiple mipmap levels; and
the render feedback circuitry is configured to, for said mipmap tail, perform an additional iteration of said loop.

4. The apparatus according to claim 1, comprising encoding the final representation as a texture.

5. The apparatus according to claim 4, comprising compressing the final representation using a texture compression algorithm.

6. The apparatus according to claim 1, wherein:
the intermediate representation is encoded as a bitmap; and
the render feedback circuitry is configured to determine the one or more of said bits to set by, for each tile region (x, y) at mipmap level m upon which the rendered output was based, performing an OR operation according to:

intermediate representation bitmap [x &~ ((1<<m)−1)] [y &~ ((1<<m)]−1)] |=1<<m.

7. The apparatus according to claim 1, wherein the graphics data receiver circuitry is configured to receive the graphics data from a processing apparatus.

8. The apparatus according to claim 7, wherein the render feedback circuitry is configured to output the final representation to the processing apparatus.

9. The apparatus according to claim 1, wherein the graphics data is texture data comprising a plurality of texels.

10. The apparatus according to claim 1, wherein at least one said plurality of representations is a mipmap tail, representing a plurality of resolutions, said plurality of resolutions being the lowest of said progressively lower resolutions.

11. The non-transitory computer-readable medium to store computer-readable code for
fabrication of an apparatus according to claim 1.

12. A method comprising:
receiving graphics data, the graphics data comprising texture mipmap data corresponding to a plurality of representations of texture data, each representation being a mipmap level having a progressively lower resolution and comprising one or more tile regions;
processing the graphics data to produce a rendered output, said processing comprising determining a used set of tile regions, the used set comprising at least one of said one or more tile regions within at least one of said mipmap levels, to base the rendered output upon; and
generating an intermediate representation of the used set of tile regions by encoding the used set of tile regions into a bitmap, wherein:
each bitmap value represents a corresponding tile region in at least one mipmap level and has a bit representing each of a plurality of said mipmap levels; and
the generating the intermediate representation comprises setting one or more of said bits representing each of the used set of tile regions,
for each combination of intermediate representation bitmap value and mipmap level, determining a bit offset to produce a z-ordering of the bitmap value bits which correspond to valid combinations of mipmap level and tile region in the received graphics data; and
generating a final representation of the used set of tile regions, by applying the z-ordering to the intermediate representation.

13. The method according to claim 12, comprising:
encoding the final representation as a texture; and
outputting the encoded final representation to processing circuitry.

14. The method according to claim 13, comprising:
unpacking, by the processing circuitry, the encoded final representation as a texture.

15. The method according to claim 13, comprising:
determining, by the processing circuitry and based on the final representation, at least one unused tile region at a given mipmap level which was not used to produce the rendered output; and
excluding said at least one unused tile region when producing subsequent graphics data.

16. A system comprising:
processing circuitry; and
an apparatus comprising:
graphics data receiver circuitry to receive graphics data from the processing circuitry, the graphics data comprising texture mipmap data corresponding to a plurality of representations of texture data, each representation being a mipmap level having a progressively lower resolution and comprising one or more tile regions;
rendering circuitry to process the graphics data to produce a rendered output, said processing comprising determining a used set of tile regions, the used set comprising at least one of said one or more tile regions within at least one of said mipmap levels, to base the rendered output upon; and
render feedback circuitry to:
generate an intermediate representation of the used set of tile regions by encoding the used set of tile regions into a bitmap, wherein:
each bitmap value represents a corresponding tile region in at least one mipmap level and has a bit representing each of a plurality of said mipmap levels; and
the render feedback circuitry sets one or more of said bits representing each of the used set of tile regions,
for each combination of intermediate representation bitmap value and mipmap level, determine a bit offset to produce a z-ordering of the bitmap value bits which correspond to valid combinations of mipmap level and tile region in the received graphics data;
generate a final representation of the used set of tile regions, by applying the z-ordering to the intermediate representation; and
output the final representation to the processing circuitry.

* * * * *